US012575539B2

(12) United States Patent (10) Patent No.: US 12,575,539 B2

Maxwell (45) Date of Patent: Mar. 17, 2026

(54) PET SEAT APPARATUS FOR ATVS

(71) Applicant: Ricky George Maxwell, Vernal, UT (US)

(72) Inventor: Ricky George Maxwell, Vernal, UT (US)

( * ) Notice: Subject to any disclaimer, the term of this patent is extended or adjusted under 35 U.S.C. 154(b) by 0 days.

(21) Appl. No.: 18/441,189

(22) Filed: Feb. 14, 2024

(65) Prior Publication Data

US 2024/0341269 A1    Oct. 17, 2024

Related U.S. Application Data

(63) Continuation-in-part of application No. 17/962,580, filed on Oct. 10, 2022, now Pat. No. 12,156,505.

(60) Provisional application No. 63/356,151, filed on Jun. 28, 2022.

(51) Int. Cl.
*A01K 1/02* (2006.01)
*B60N 2/24* (2006.01)

(52) U.S. Cl.
CPC .............. *A01K 1/0272* (2013.01); *B60N 2/24* (2013.01)

(58) Field of Classification Search
CPC ...... A01K 1/0272; A01K 1/0281; B60N 2/24; B60N 2/28; B60N 2/32; B60N 2/36; B60N 2/065
See application file for complete search history.

(56) References Cited

U.S. PATENT DOCUMENTS

| | | | | |
|---|---|---|---|---|
| 5,785,003 A | * | 7/1998 | Jacobson | A01K 1/0272 |
| | | | | 119/28.5 |
| 11,006,612 B2 | * | 5/2021 | Ryan | B60N 3/001 |
| 2004/0173653 A1 | * | 9/2004 | Audet | B60N 2/24 |
| | | | | 224/415 |

FOREIGN PATENT DOCUMENTS

| | | | | | |
|---|---|---|---|---|---|
| EP | 3387900 A1 | * | 10/2018 | | A01K 1/0272 |
| KR | 102256727 B1 | * | 5/2021 | | B60N 2/24 |

* cited by examiner

*Primary Examiner* — Peter M Poon
*Assistant Examiner* — Danielle A Clerkley
(74) *Attorney, Agent, or Firm* — Hall Estill Law Firm

(57) ABSTRACT

A pet seat apparatus for a side-by-side ATV. The pet seat apparatus includes a seat base with at least one customized side to closely fit contours of a part of the ATV. The seat base includes a first support side for supporting a pet in the ATV and a second support side. The pet seat apparatus also includes a support apparatus for holding the seat base at a desire position in the ATV.

18 Claims, 15 Drawing Sheets

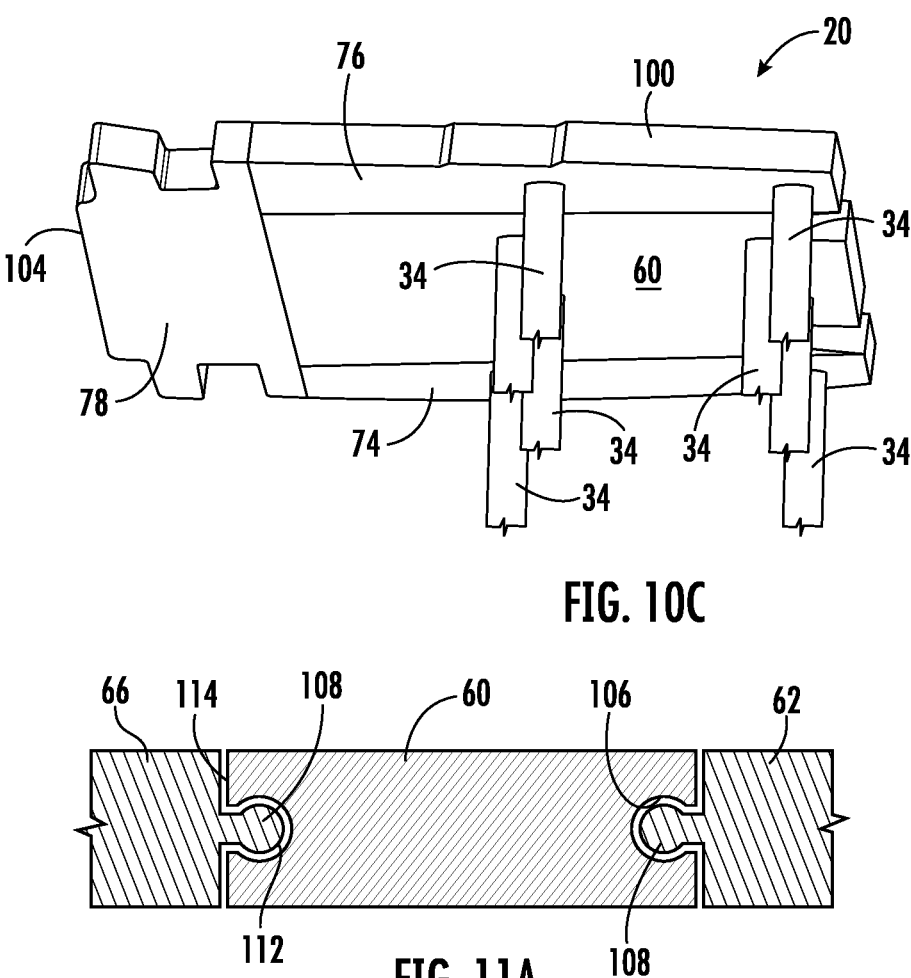
FIG. 10C
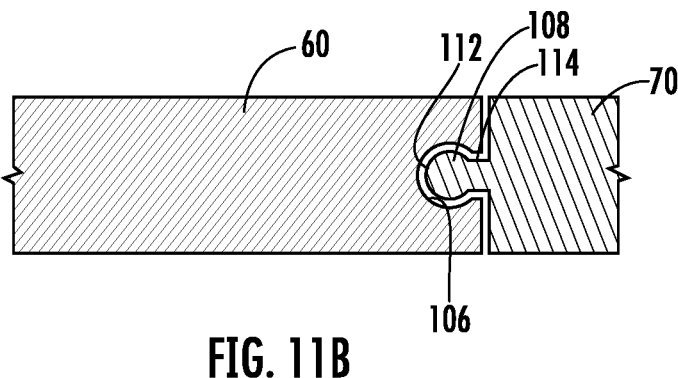
FIG. 11A
FIG. 11B

PET SEAT APPARATUS FOR ATVS

CROSS-REFERENCE TO RELATED APPLICATIONS

The present application is a continuation-in-part of U.S. Ser. No. 17/962,580, filed Oct. 10, 2022, which is a conversion of U.S. Provisional Application having U.S. Ser. No. 63/356,151, filed Jun. 28, 2022, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a pet seat apparatus for back seats of side-by-side all-terrain vehicles (ATVs).

2. Description of the Related Art

Some side-by-side ATVs have a back seat or seats behind the front seats. There are several places around the back seat(s) where a pet's paw or leg could slip down into and potentially cause serious injury to the pet. Examples of problematic spaces include, but are not limited to, the space between the seat and console or between the seat and the door. The space in front of the rear seats can also be problematic for pets should quick stopping of the ATV be necessary.

Accordingly, there is a need for a pet seat apparatus that accounts for these problematic spaces.

SUMMARY OF THE DISCLOSURE

The present disclosure is directed to a pet seat apparatus for an ATV. The pet seat apparatus includes a seat base with at least one customized side to closely fit contours of a part of the ATV. The seat base includes a first support side for supporting a pet in the ATV and a second support side. The pet seat apparatus also includes a support apparatus for holding the seat base at a desire position in the ATV.

BRIEF DESCRIPTION OF THE DRAWINGS

FIG. 10C is a perspective view of an underside of the pet seat apparatus shown in FIG. 10A.

FIG. 11A is a cross-sectional view of a part of the pet seat apparatus shown in FIG. 9A or 10A.

FIG. 11B is a cross-sectional view of another part of the pet seat apparatus shown in FIG. 9A or 10A.

DETAILED DESCRIPTION OF THE DISCLOSURE

Figures 1, 2:
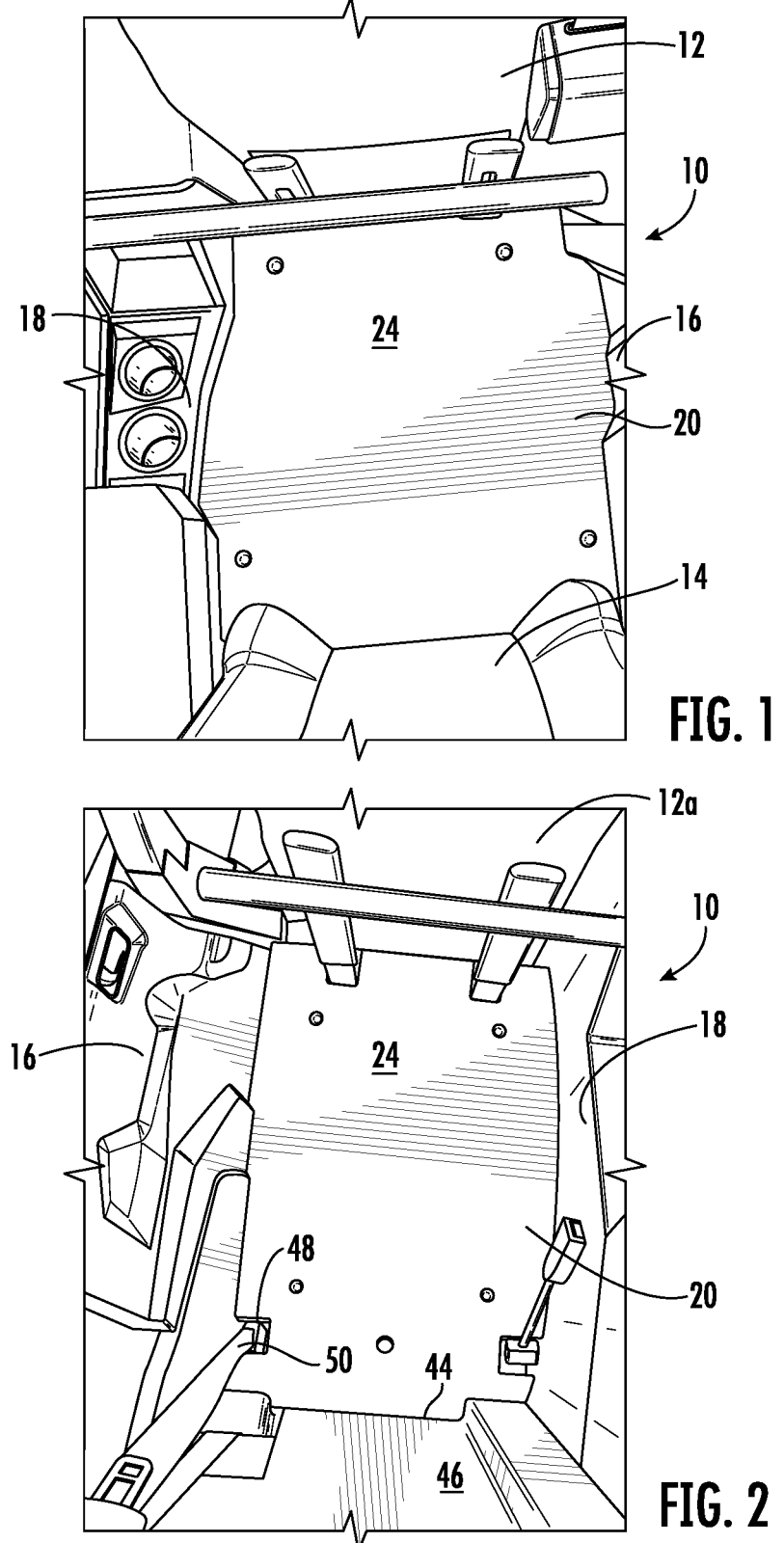
FIG. 1 is a perspective view of a pet seat apparatus for an ATV constructed in accordance with the present disclosure.
FIG. 2 is a perspective view of another embodiment of a pet seat apparatus for an ATV constructed in accordance with the present disclosure.
Figure 3:
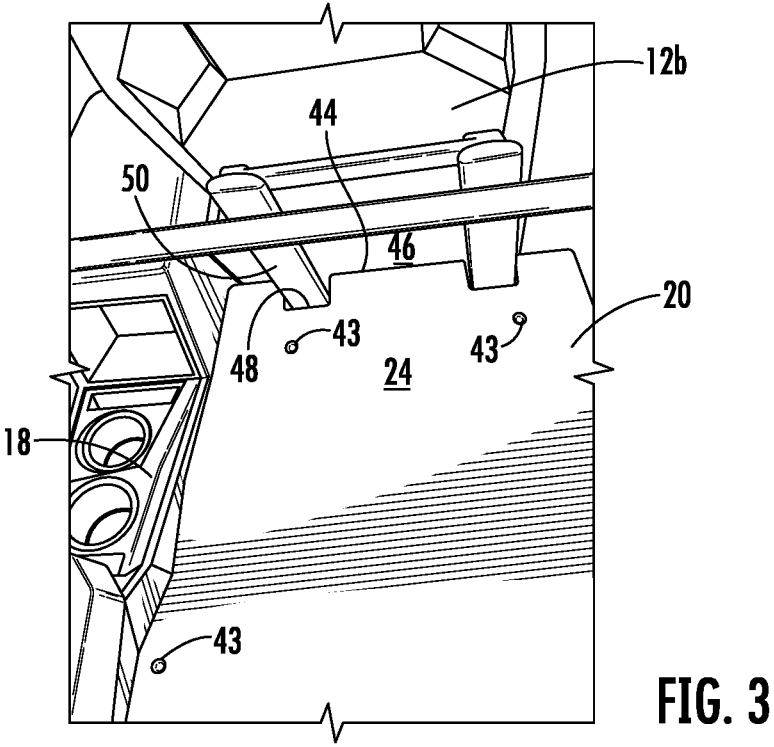
FIG. 3 is another perspective view of the pet seat apparatus constructed in accordance with the present disclosure.
Figure 4:
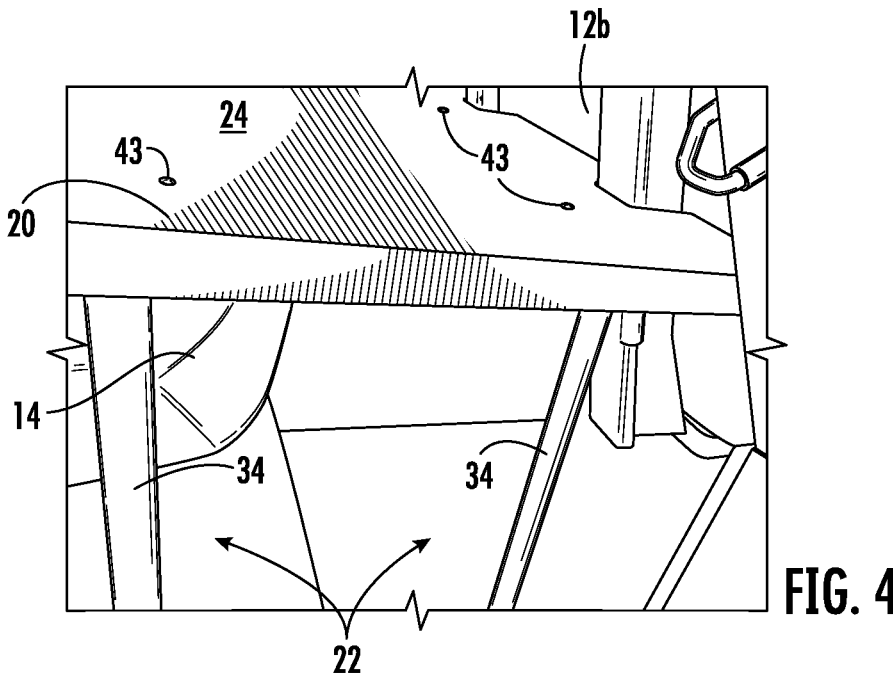
FIG. 4 is another perspective view of the pet seat apparatus constructed in accordance with the present disclosure.

The present disclosure, shown in FIGS. 1-8D, relates to a pet seat apparatus 10 for placement behind the front seat (passenger, driver, or both) 12 of a side-by-side ATV. The pet seat apparatus 10 can be customized to fit behind the front seat(s) 12 to eliminate (or significantly reduce) problematic spaces that exist adjacent to the back seats 14. Problematic spaces are any spaces that exist adjacent to the back seat(s) 14 where a pet could inadvertently get their paw or leg into, which could lead to potential injury. Some examples of problematic spaces are spaces between the seat 14 and the doors 16, spaces between the seats 14 and a console 18, or spaces between two adjacent seats 14.

The pet seat apparatus 10 includes a seat base 20 and a support apparatus 22. The seat base 20 includes a first support side 24, a second support side 26 with a plurality of customized sides 28. The customized sides 28 are shaped specifically to conform to the shape of the part of the ATV the pet seat apparatus 10 is adjacent to when in place. The first support side 24 is designed to support a pet riding in the back seat area of the ATV. The second support side 26 is designed to engage with the support apparatus 22 that holds the seat base 20 at a desired vertical position. The seat base 20 can be constructed of a single piece of material or made from multiple components wherein some of the components are custom components to the particular model of ATV the pet seat apparatus 10 is going in and some components are standard components that the custom components attach to.

The support apparatus 22 can include any devices or components capable of engaging the seat base 20 and a part of the ATV and maintain the seat base 20 at the desired position. The support apparatus 22 can be constructed of multiple support posts 34 that engage with the second support side 26 of the seat base 20 and various parts of the ATV. The support posts 34 can engage with any part of the ATV (e.g., the floorboard, the base of the ATV adjacent to the seats or console, etc.). The bottoms 36 of the support posts 34 can be connected via base members to provide additional stability to the support apparatus 22. In one embodiment, the support posts 34 can have a wider base portion to increase the stability of the support posts 34. In another embodiment, the support apparatus 22 can include base members and wider base portions to further increase the stability of the support apparatus 22. The top ends 38 of the support posts 34 can engage the second support side 26 of the seat base 20 in any manner known in the art. For example, the top ends 38 of the support posts 34 can have shafts 40 (that can be threaded or unthreaded) extending therefrom that engage in openings 42 (that can be threaded or unthreaded) disposed in the second support side 26 of the seat base 20. In one exemplary embodiment, the top ends 38 of the support posts 34 can have threaded shafts 40 extending therefrom that can frictionally engage threaded openings 42 disposed in the second support side 26 of the seat base 20. In another exemplary embodiment, the top ends 38 of the support posts 34 can have unthreaded shafts 40 extending therefrom that can frictionally engage openings 42 disposed in the second support side 26 of the seat base 20.

Each customized side 28 is designed to conform to the shape of the parts of the ATV immediately adjacent to the seat base 20. In one embodiment of the present disclosure, one customized side 28 can be the front seat side 28a, one can be the door side 28b, one can be the seat side 28c (this can be the side that is adjacent to one of the back seats 14 or the back of the cab if the back seat 14 is removed) and one can be the console side 28d. In this embodiment, the pet seat apparatus 10 is designed to go behind the front driver seat 12a or the front passenger seat 12b. Each customized side 28 can have as many protrusions 44 on the side 28 as the ATV has recessed areas 46 immediately adjacent to the respective customized side 28. Similarly, each customized side 28 can have as many recessed portions 48 as the ATV has protrusion areas 50 immediately adjacent to the respective customized side 28. The seat base 20 can also include a customized side 28c that can engage with the rear seat 14 wherein the rear seat 14 can be all the way back when the pet seat apparatus 10 is put into position. The rear seat 14 can then be slid forward to securely engage the customized side 28c of the seat base 20 to provide additional securement of the pet seat apparatus 10 in the rear of the ATV.

Figures 5, 6:
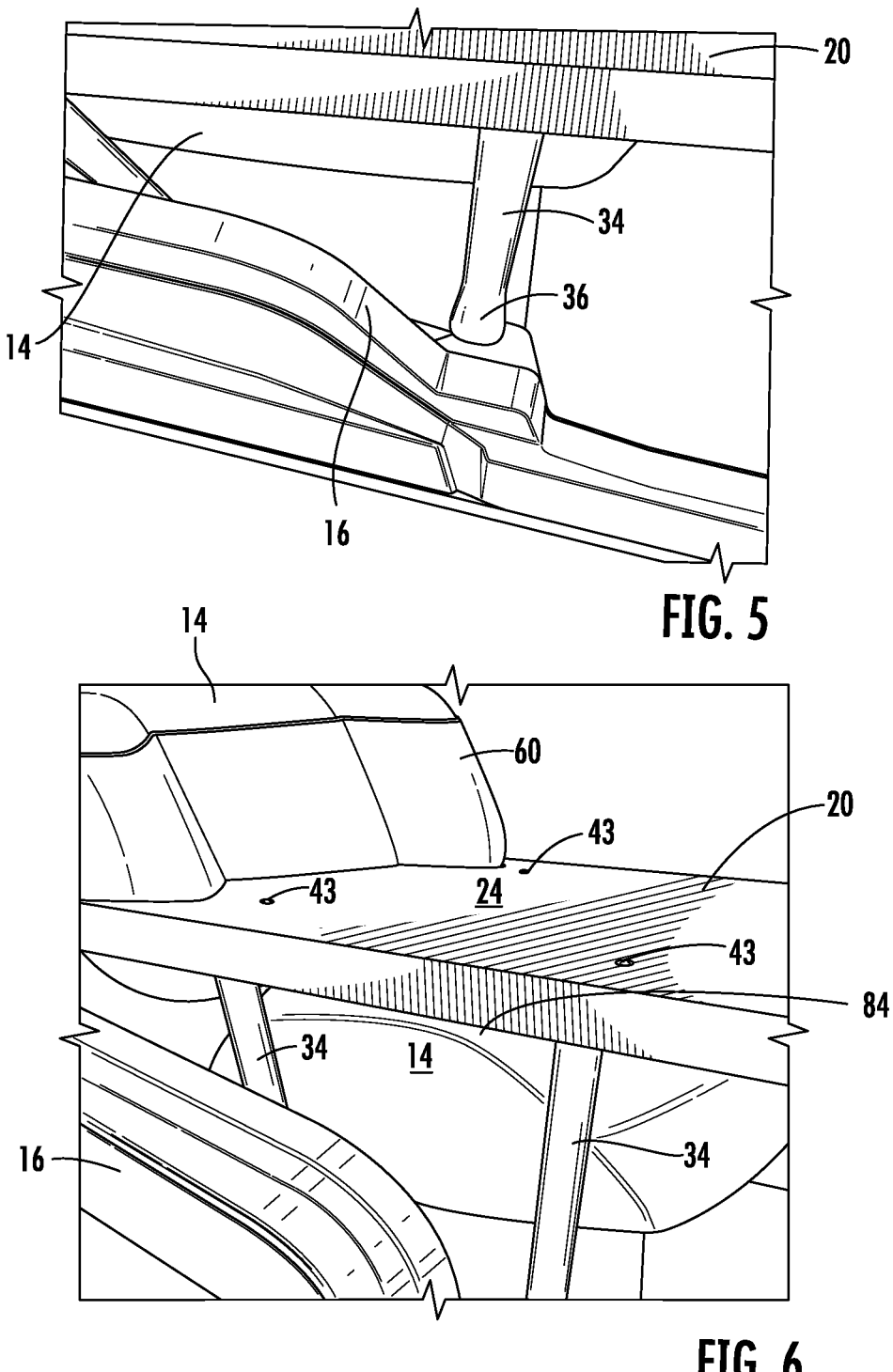
FIG. 5 is another perspective view of the pet seat apparatus constructed in accordance with the present disclosure.
FIG. 6 is another perspective view of the pet seat apparatus constructed in accordance with the present disclosure.
Figure 7A:
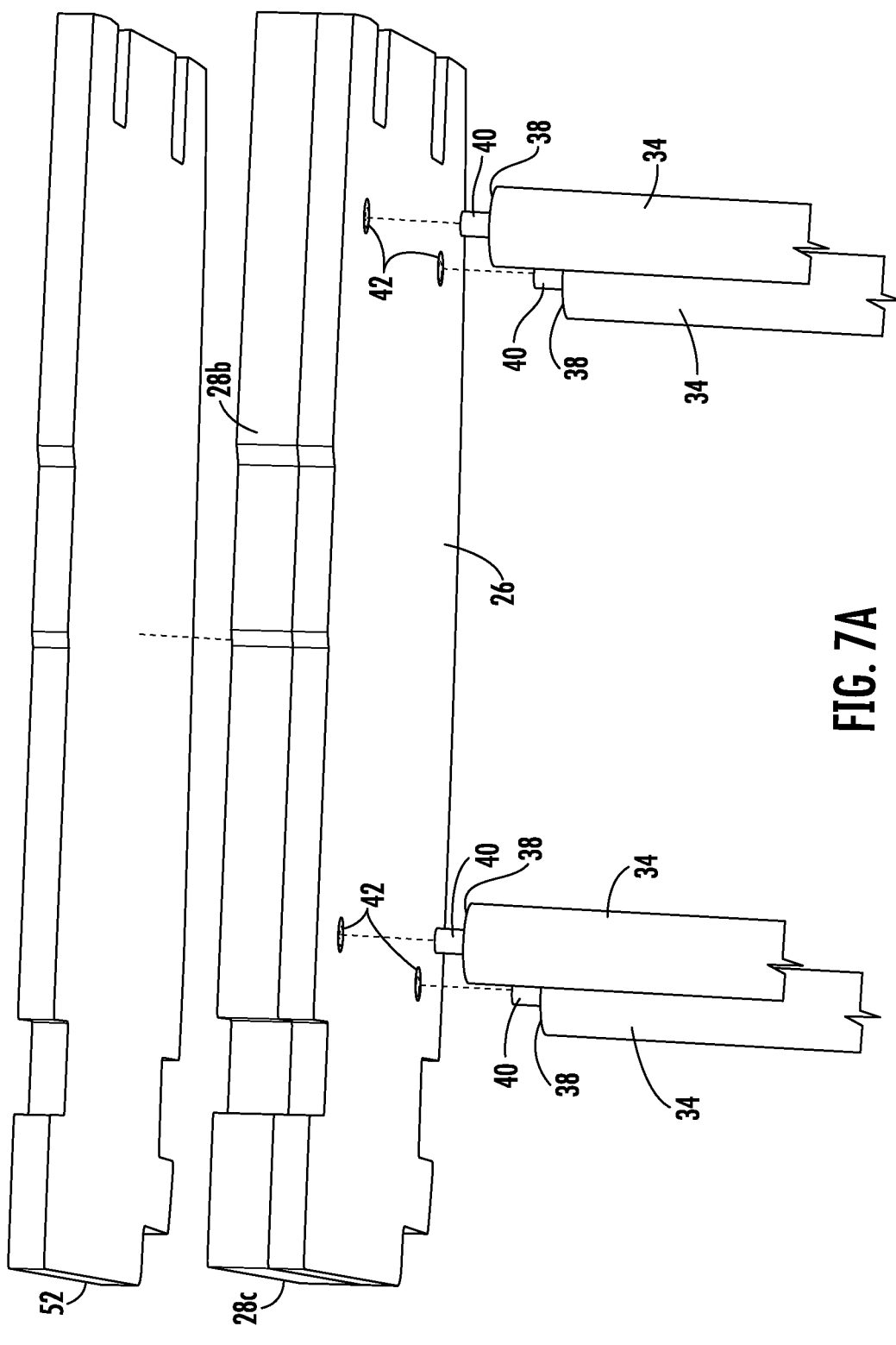
FIGS. 7A and 7B are exploded views of the pet seat apparatus in different orientations constructed in accordance with the present disclosure.
Figure 7B:
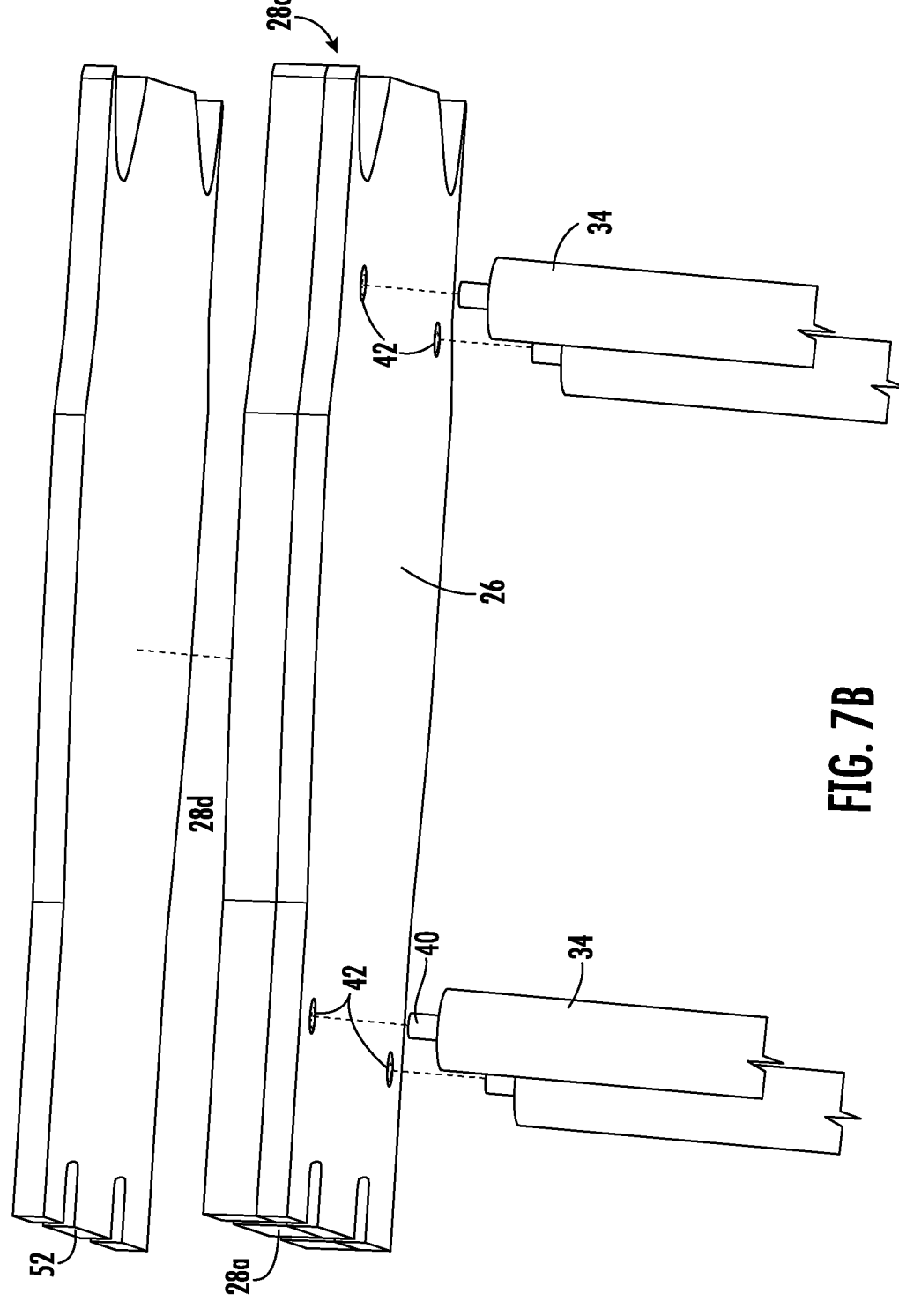
Figure 8A:
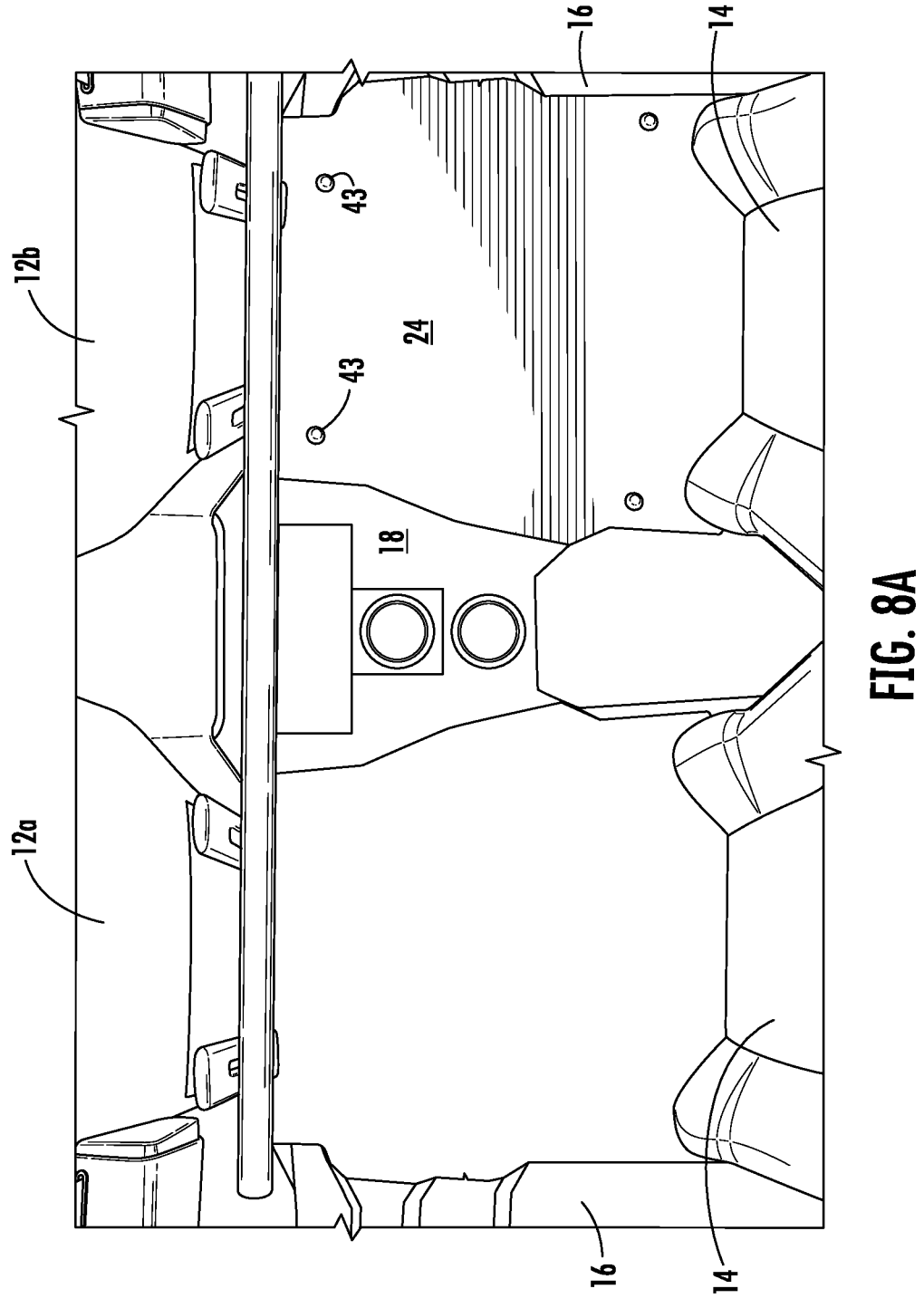
FIGS. 8A-8D are perspective views of various positions of the pet seat apparatus constructed in accordance with the present disclosure.
Figure 8B:
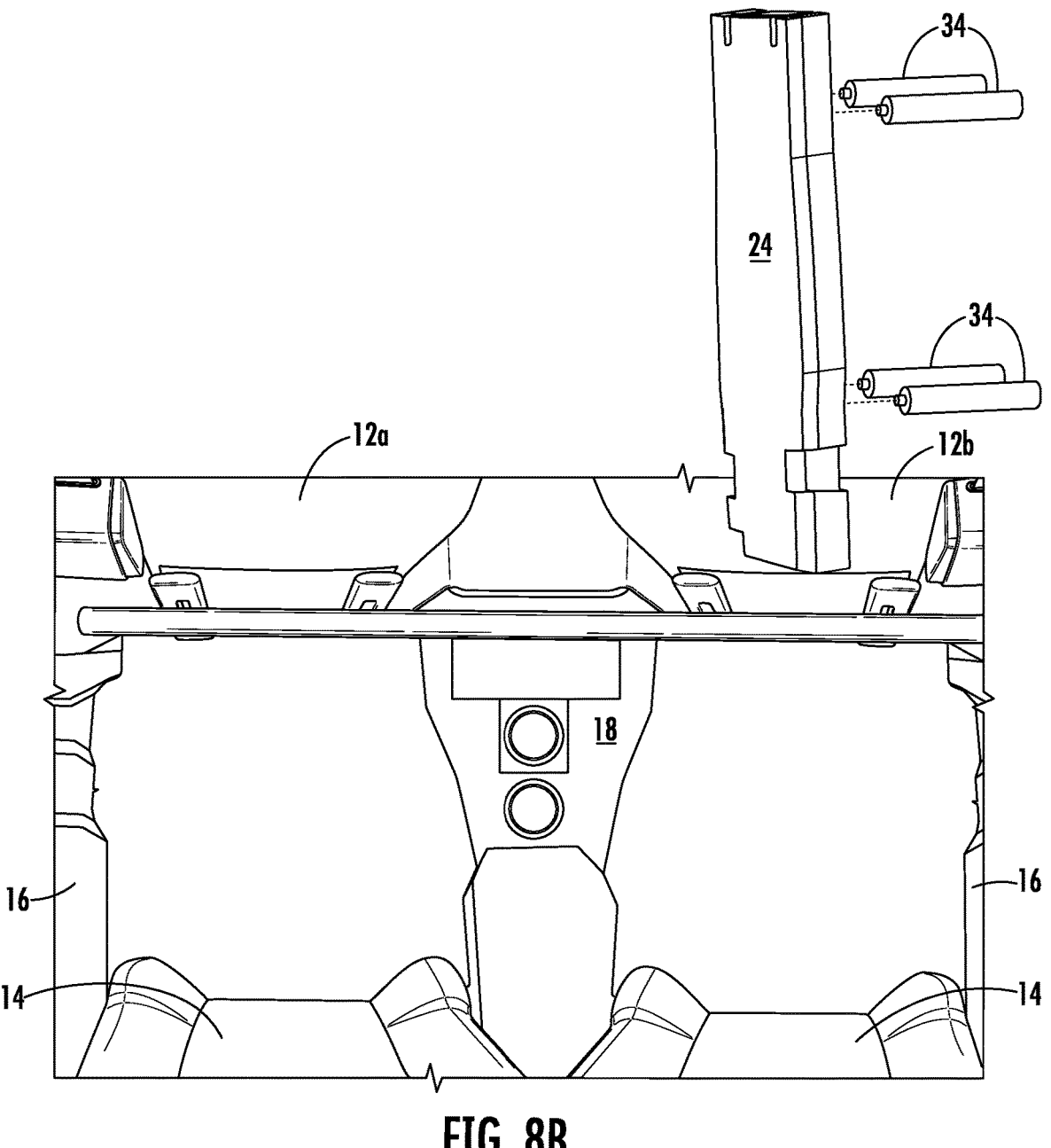
Figure 8C:
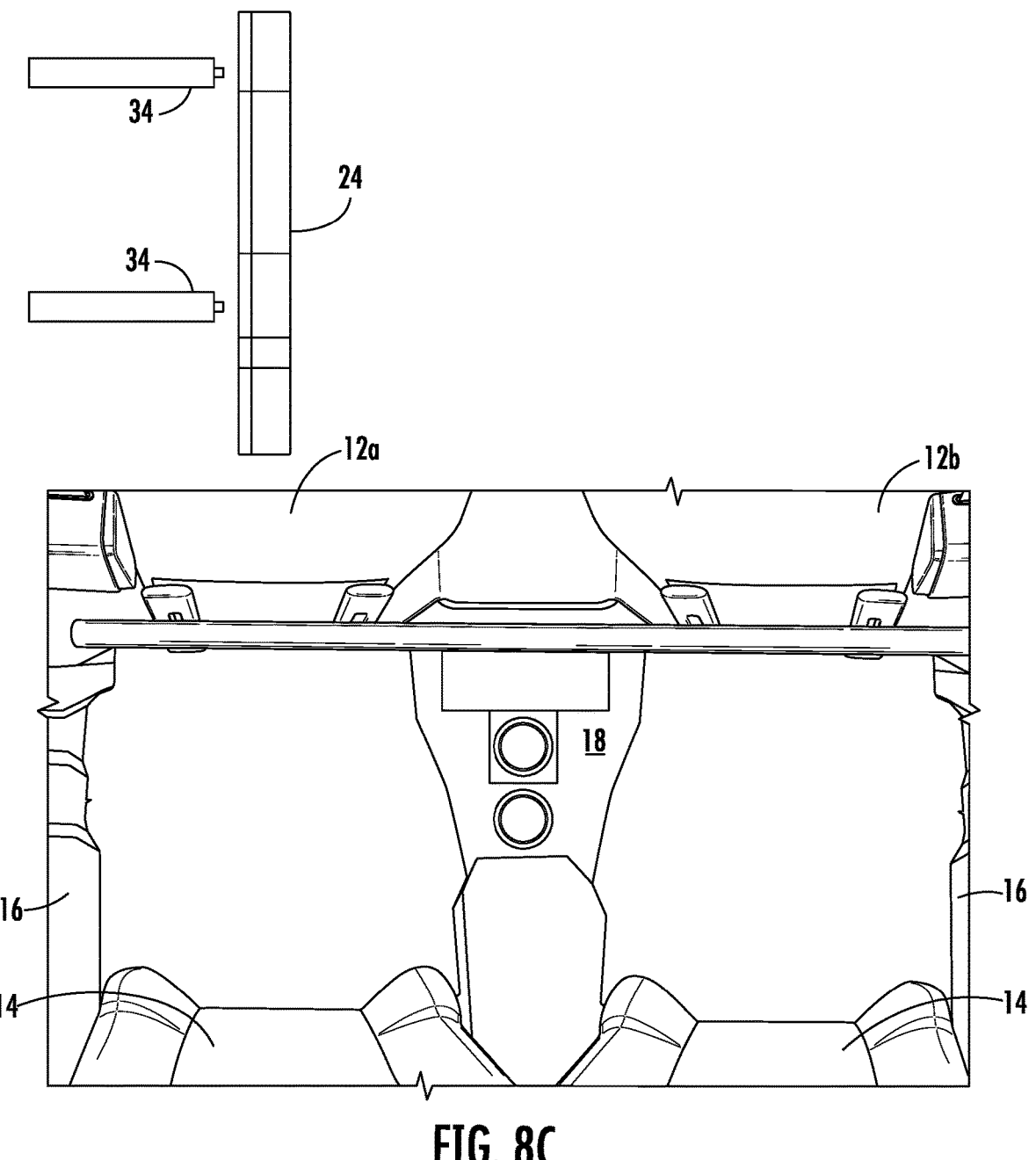
Figure 8D:
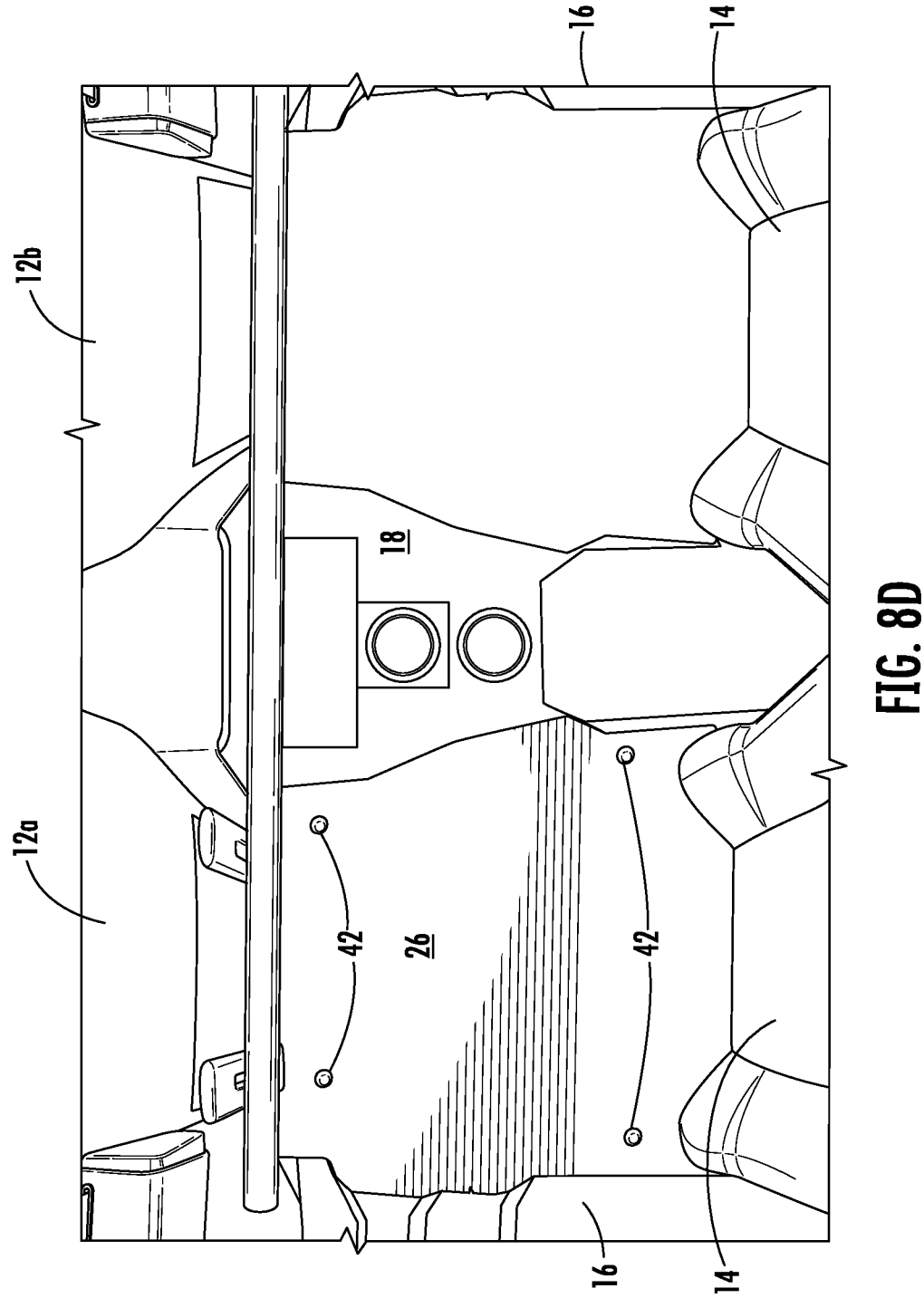
Figures 9A, 9B:
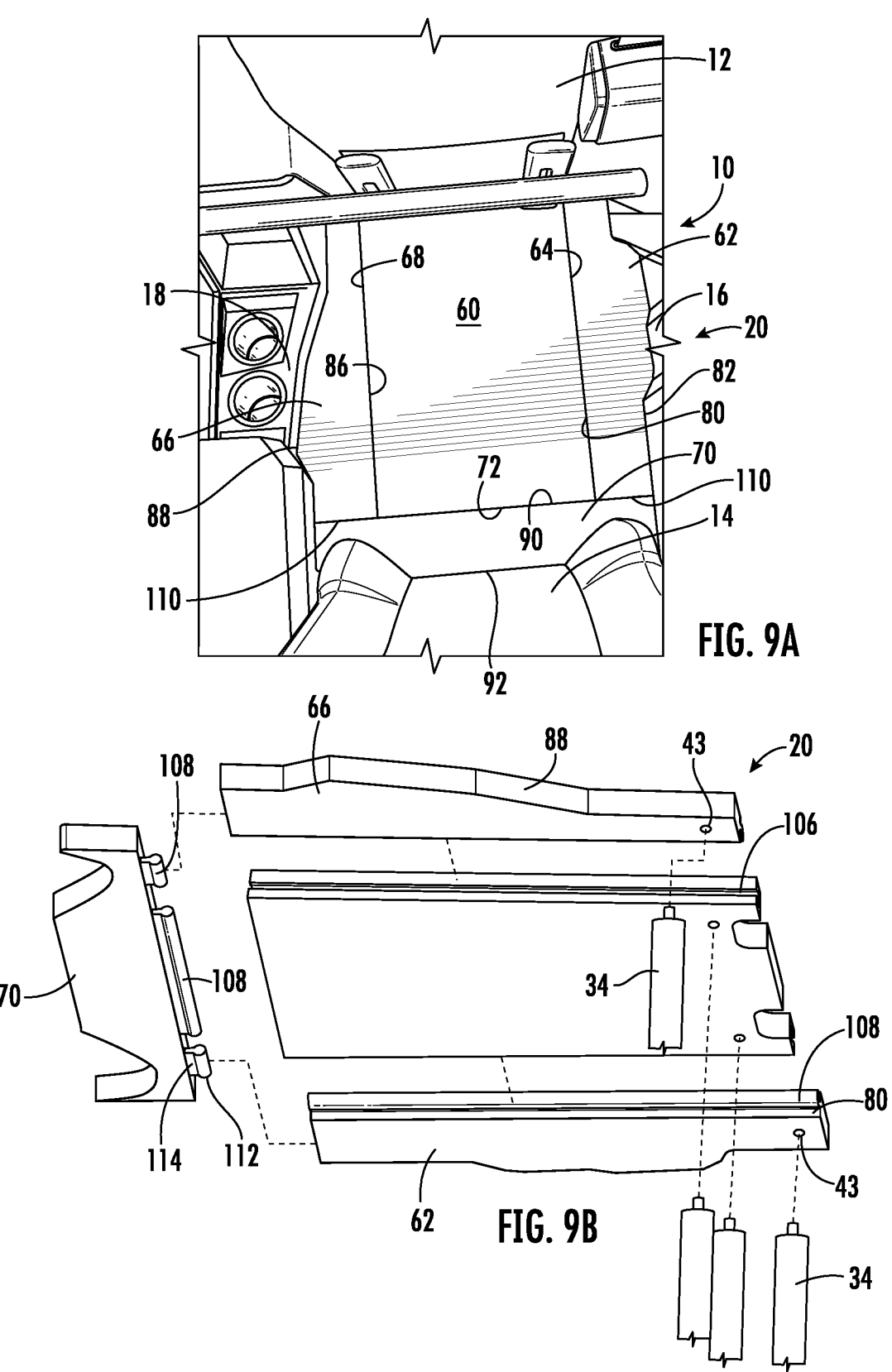
FIG. 9A is top plan view of one embodiment of the pet seat apparatus constructed in accordance with the present disclosure.
FIG. 9B is an exploded, perspective view of an underside of the pet seat apparatus shown in FIG. 9A.
Figure 9C:
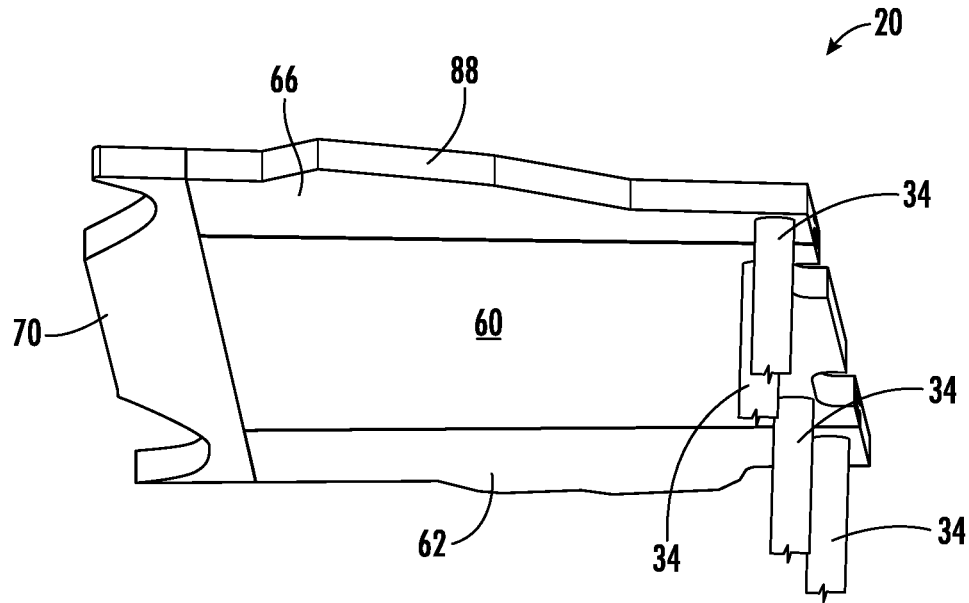
FIG. 9C is a perspective view of an underside of the pet seat apparatus shown in FIG. 9A.
Figures 10A, 10B:
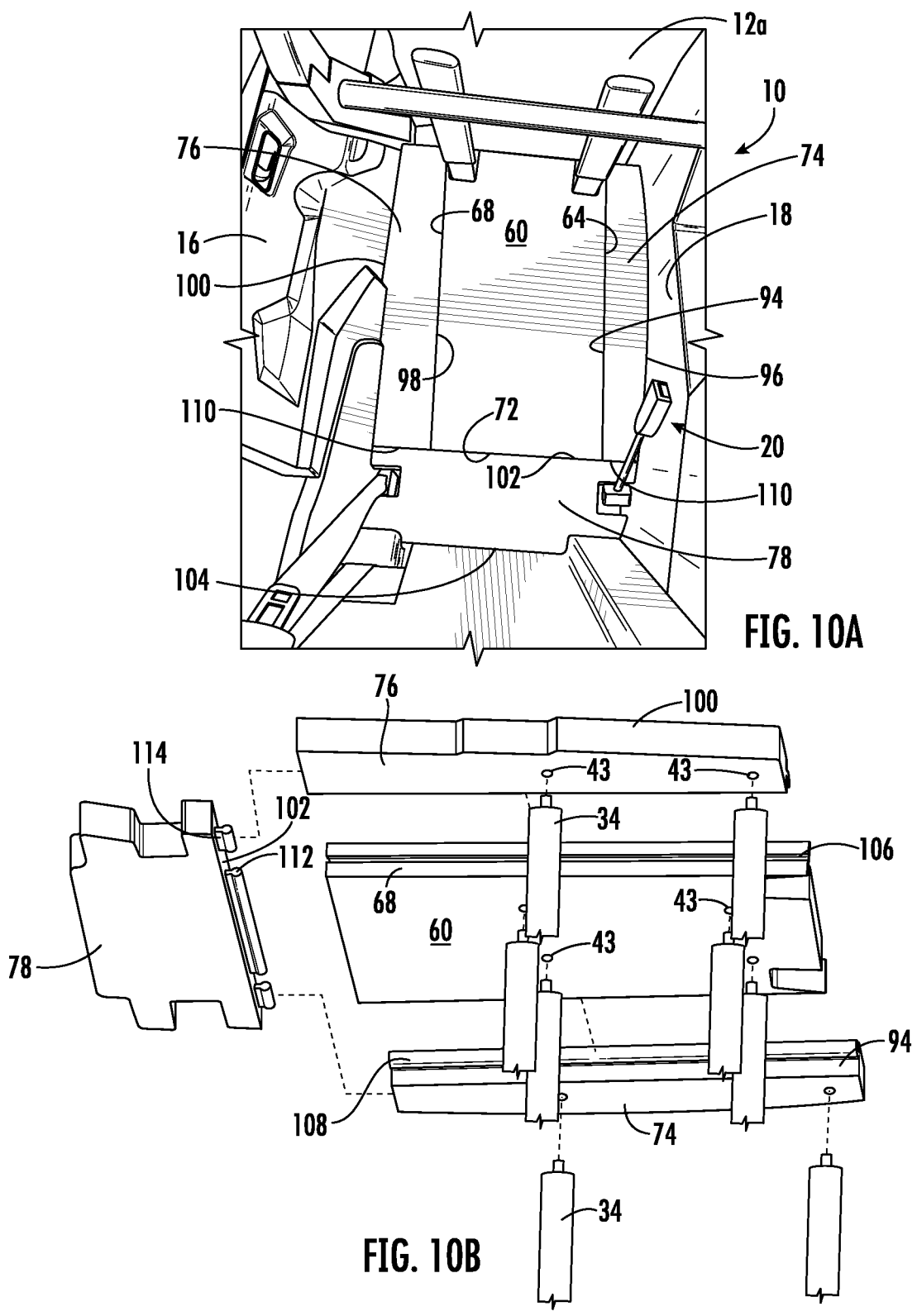
FIG. 10A is top plan view of another embodiment of the pet seat apparatus constructed in accordance with the present disclosure.
FIG. 10B is an exploded, perspective view of an underside of the pet seat apparatus shown in FIG. 10A.
Figure 12A:
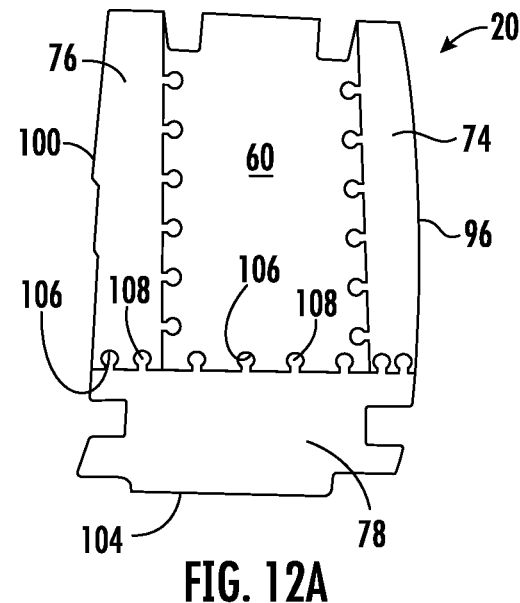
FIG. 12A is top plan view of another embodiment of the pet seat apparatus constructed in accordance with the present disclosure.
Figure 12B:
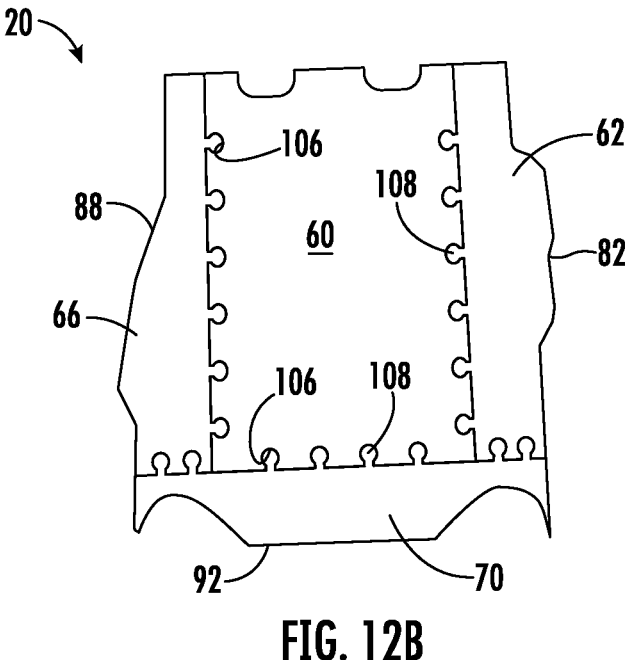
FIG. 12B is top plan view of yet another embodiment of the pet seat apparatus constructed in accordance with the present disclosure.

In another embodiment of the present disclosure shown in FIG. 6, the pet seat apparatus 10 can include a safety wall 60 that extends upward from the rear customized side 28c of the seat base 20 to prevent the custion of the back seat 14 from giving way and permitting a pet to get their paw caught between the back seat 14 and the seat base 20. The safety wall 60 would be designed such that it conformed to the rear seat 14 and the shape of the customized side 28c of the seat base 20. The safety wall 60 can extend directly upward from the seat base 20 or it can extend upward at an angle from the seat base 20.

In another embodiment of the present disclosure, the pet seat apparatus 10 can extend across the whole width of the ATV. In this embodiment, the seat base 20 would be designed to be positioned above the console if there was one. One customized side would conform to the shape of the back passenger door, one customized side would conform to the shape of the back driver side door, one customized side would conform to the shape of the back of both the front and passenger front seats, and one customized side would conform to the rear seats (if they are still in the ATV) and any portion of the rear wall the seat base might be close to. In any embodiment of the present disclosure, the rear seats could be removed and one of the customized sides of the seat base would conform to the shape of the back of the cab of the ATV.

In yet another embodiment of the present disclosure shown in FIGS. 8A-8D, any single pet seat apparatus 10 described or shown herein can be designed to fit behind the front passenger seat 12b or the front driver seat 12a. In this embodiment, the pet seat apparatus 10 can be designed to go behind the front driver seat 12a wherein the first support side 24 of the seat base 20 supports the pet and the second support side 26 engages with the support apparatus 22 to hold the pet seat apparatus 10 in the desired position. This same pet seat apparatus 10 can have the support apparatus 22 removed and the seat base 20 can be rotated about a centerline that splits the driver seats 12a and the passenger seats 12b. When the seat base 20 is transitioned from its first position behind the front driver seat 12a to its second position behind the front passenger seat 12b, the second support side 26 becomes the side of the seat base 20 that supports the pet and the first support side 24 becomes the side of the seat base 20 that engages the support apparatus 22. The first support side 24 can have openings 43 (threaded or not) disposed therein to engage the top ends 38 of the support posts 34.

The pet seat apparatus 10 can also include a pad 52 that sits atop the seat base 20 for comfort of the animal. In one embodiment, the pad 52 could be built into the seat base 20. The pet seat apparatus 10 can also include a protective layer (not shown) that covers the pad 52 to protect it from moisture and wear and tear from the pet. The protective layer can also be designed to be secured at least partially around the pads 52 and the seat base 20 for any configuration of the pet seat apparatus 10 described herein.

In another embodiment of the present disclosure shown in more detail in FIGS. 9A-13B, the seat base 20 of the pet seat apparatus 10 can be made of multiple pieces so the pet seat apparatus can be configurable to be placed in the rear of the ATV with the back seat 14 in or with the back seat 14 out. The seat base 20 can include a central piece 60 that can be used whether the pet seat apparatus 10 is used with the back seat 14 in or the back seat 14 out. For the "seat in" configuration of the ATV, the seat base 20 includes a first door side piece 62 that is selectively securable to a door side 64 of the central piece 60, a first console side piece 66 selectively securable to a console side 68 of the central piece 60 and a first rear side piece 70 selectively securable to a rear side 72 of the central piece 60. For the "seat out" configuration of the ATV, the seat base 20 includes a second door side piece 74 that is selectively securable to the door side 64 of the central piece 60, a second console side piece 76 selectively securable to the console side 68 of the central piece 60 and a second rear side piece 78 selectively securable to the rear side 72 of the central piece 60 on one side. The first rear side piece 70 can also be selectively securable to rear sides of the first door side piece 62 and the first console side piece 66. Similarly, the second rear side piece 78 can also be selectively securable to rear sides of the second door side piece 74 and the second console side piece 76.

For the "seat in" configuration shown in FIGS. 9A-9C and 12B-13A, the first door side piece 62 is configured to engage the central piece 60 on a first side 80 and have a second side 82 that is contoured to match the contour of the inside of the rear door 16 at a certain height above a seat bottom 84 of the back seat 14. The second side 82 of the first door side piece 62 can be contoured such that any space between the second side 82 of the first door side piece 62 and the inside of the rear door 16 is less than a desired distance so as to prevent a pet's paw (or any other body part) from entering said space. Similarly, the first console side piece 66 is configured to engage the central piece 60 on a first side 86 and have a second side 88 that is contoured to match the contour of the console 18 at a certain height above the seat bottom 84 of the back seat 14. The second side 88 of the first console side piece 86 can be contoured such that any space between the second side 82 of the first console side piece 66 and the console 18 is less than a desired distance so as to prevent a pet's paw (or any other body part) from entering said space. Furthermore, the first rear side piece 70 is configured to engage the central piece 60 on a first side 90 of the first rear side piece 70 and have a second side 92 that is contoured to match the contour of the backrest of the back seat 14 and be able to rest on the seat bottom 84 of the back seat 14. The second side 92 of the first rear side piece 70 can be contoured such that any space between the second side 92 of the first rear side piece 70 and the backrest of the back seat 14 is less than a desired distance so as to prevent a pet's paw (or any other body part) from entering said space.

For the "seat out" configuration shown in FIGS. 10A-10C, 12A and 13B, the second door side piece 74 is configured to engage the central piece 60 on a first side 94 and have a second side 96 that is contoured to match the contour of the inside of the rear door 16 at a certain height above the floorboard of the ATV. The second side 96 of the second door side piece 74 can be contoured such that any space between the second side 96 of the second door side piece 74 and the inside of the rear door 16 is less than a desired distance so as to prevent a pet's paw (or any other body part) from entering said space. Similarly, the second console side piece 76 is configured to engage the central piece 60 on a first side 98 and have a second side 100 that is contoured to match the contour of the console 18 at a certain height above the floorboard of the ATV. The second side 100 of the second console side piece 76 can be contoured such that any space between the second side 100 of the second console side piece 76 and the console 18 is less than a desired distance so as to prevent a pet's paw (or any other body part) from entering said space. Furthermore, the second rear side piece 78 is configured to engage the central piece 60 on a first side 102 of the second rear side piece 78 and have a second side 104 that is contoured to match the contour of the back of the cab of the ATV. The second side 104 of the second rear side piece 78 can be contoured such that any space between the second side 104 of the second rear side piece 78 and the back of the cab of the ATV is less than a desired distance so as to prevent a pet's paw (or any other body part) from entering said space.

Depending on the layout of the ATV and how the pieces of the seat base 20 are laid out, sides of the first and second rear side pieces 70 and 78 can be contoured to match the contour of the inside of the back door 16 of the ATV and the console 18, respectively. The contoured sides are incorporated so that any space between the sides of the first and second rear side pieces 70 and 78 and the inside of the door 16 of the ATV and the console 18, respectively, is less than a desired distance so as to prevent a pet's paw (or any other body part) from entering the space. Similarly, front sides of the central piece 60, the first and second door side pieces 62 and 74 and the first and second console side pieces 66 and 76 can be contoured to match the backside of the front seat 12 to reduce the space between the seat base 20 and the backside of the front seat 12.

The space between the parts of the ATV and the pieces of the seat base 20 can be any distance such that a pet's paw cannot fit between the parts of the ATV and the pieces of the seat base 20. In one embodiment, the space between the parts of the ATV and the pieces of the seat base 20 is less than about one inch. In another embodiment, the space between the parts of the ATV and the pieces of the seat base 20 is less than about half an inch. In yet another embodiment, the space between the parts of the ATV and the pieces of the seat base 20 is less than about one quarter of an inch. In an even further embodiment, the space between the parts of the ATV and the pieces of the seat base 20 is less than about one eighth of an inch.

The pieces of the seat base 20 can be held together by any means known to one of ordinary skill in the art. In one exemplary embodiment, a tongue and groove system can be used to combine the pieces of the seat base 20. In one embodiment shown in FIGS. 9A-11B, the central piece 60 of the seat base 20 can include a series of grooves 106 disposed in each side 64, 68 and 72 of the central piece 60 that run along the length of each side. Conversely, the first sides 80, 86, 90, 94, 98 and 102 of the corresponding pieces of the seat base 20 can each have a tongue portion 108 that extends along at least a portion of the lengths of the first sides 80, 86, 90, 94, 98 and 102 of the corresponding pieces of the seat base 20 that can slidingly and matingly engage the grooves 106 in the sides 64, 68 and 72 of the central piece 60. Rear ends 110 of the first and second door side pieces 62 and 74 and the first and second console side pieces 66 and 76 can also include a groove 106 disposed therein to matingly and slidingly engage the tongue 108 disposed on the first side 90 of the first rear side piece 70 or the tongue 108 disposed on the first side 102 of the second rear side piece 78. It should be understood and appreciated that the location of the grooves 106 and tongues 108 can be flipped on the pieces of the seat base 20.

In another embodiment shown in FIGS. 12A-13B, the tongues 108 and grooves 106 can be disposed along the height of the sides of the pieces of the seat base 20 and each side can have multiple tongues 108 or multiple grooves 106. Which sides of which pieces of the seat base 20 have the tongues 108 and which have the grooves 106 depends on the design choice. The tongues 106 described herein can have any desired cross-sectional shape such that when two pieces of the seat base 20 are attached to one another, the pieces cannot be pulled apart without sliding the pieces apart. Conversely, the grooves 106 can have a cross-sectional shape that is inverse of the cross-sectional shape of the tongues 108. For example, the tongues 108 can have a bulbous portion 112 and a neck portion 114 wherein the bulbous portion 112 fits into a wider part of the tongue 108 and the neck portion 114 fits into a narrower part of the tongue 108. It should be understood and appreciated that the tongues could have any polygonal cross-sectional shape desired at the end of the neck portion 114.

Figures 13A, 13B:
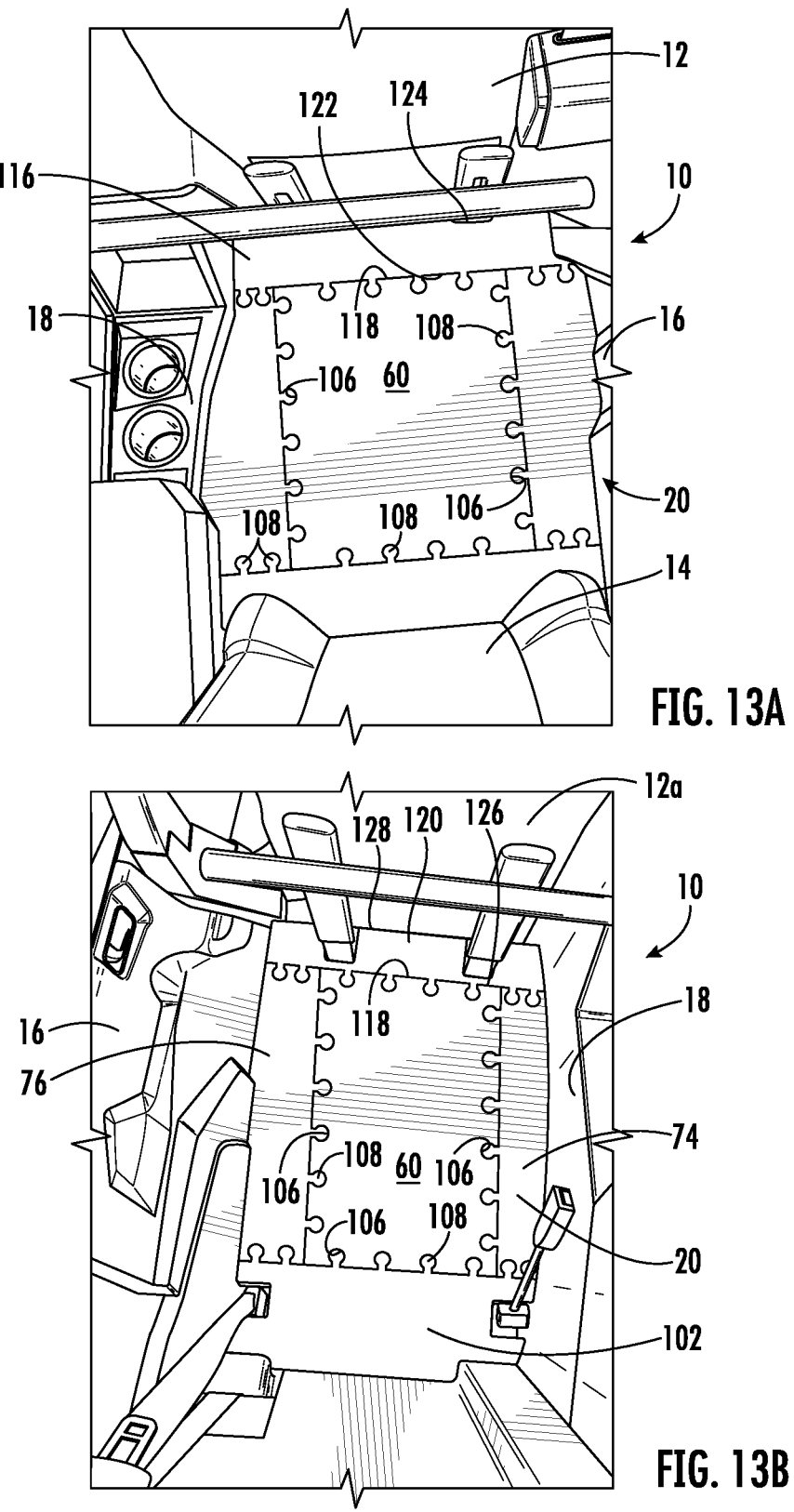
FIG. 13A is top plan view of a further embodiment of the pet seat apparatus constructed in accordance with the present disclosure.
FIG. 13B is top plan view of yet another embodiment of the pet seat apparatus constructed in accordance with the present disclosure.

In a further embodiment of the present disclosure shown in more detail in FIGS. 13A and 13B, the seat base 20 of the pet seat apparatus 10 can include a first front side piece 116 for the "seat in" configuration that is selectively securable to a front side 118 of the central piece 60. Similar to previous embodiments, the seat base 20 of the pet seat apparatus 10 can also include a second front side piece 120 for the "seat out" configuration that is selectively securable to the front side 118 of the central piece 60. For the "seat in" configuration, the first front side piece 116 is configured to engage the front side 118 of the central piece 60 on a first side 122 of the first front side piece 116 and have a second side 124 that is contoured to match the contour of the back of the front seat 12. The second side 124 of the first front side piece 116 can be contoured such that any space between the second side 124 of the first front side piece 116 and the back of the front seat 12 is less than a desired distance so as to prevent a pet's paw (or any other body part) from entering said space. For the "seat out" configuration, the second front side piece 120 is configured to engage the front side 118 of the central piece 60 on a first side 126 of the second front side piece 120 and have a second side 128 that is contoured to match the contour of the back of the front seat 12. The second side 128 of the second front side piece 120 can be contoured such that any space between the second side 128 of the second front side piece 120 and the back of the front seat 12 is less than a desired distance so as to prevent a pet's paw (or any other body part) from entering said space.

Depending on the layout of the ATV and how the pieces of the seat base 20 are laid out, sides of the first and second front side pieces 116 and 120 can be contoured to match the contour of the inside of the back door 16 of the ATV and the console 18, respectively. The contoured sides are incorporated so that any space between the sides of the first and second front side pieces 116 and 120 and the inside of the door 16 of the ATV and the console 18, respectively, is less than a desired distance so as to prevent a pet's paw (or any other body part) from entering the space. It should be understood and appreciated that the spaces for the front side pieces 116 and 120 are the same as the spaces described herein.

Similar to the support apparatus 22 described herein, the support apparatus 22 can include any devices or components capable of engaging the seat base 20 and a part of the ATV and maintain the seat base 20 at the desired position. The support apparatus 22 can be constructed of multiple support posts 34 that engage the various pieces of the seat base 20. Each piece of the seat base 20 can have a separate support post 34 that engages a part of the ATV to maintain the seat base 20 at the desired position. In certain situations, the pieces could have multiple support posts 34 engageable therewith to support the seat base 20. The embodiments shown in FIGS. 9A-13B can be designed to fit behind the front passenger seat 12*b* or the front driver seat 12*a* and be designed to be able to be flipped over and fit behind the other of the front passenger seat 12*b* or the front driver seat 12*a* as described in FIGS. 8A-8D. The difference being the seat base 20 is made up of multiple pieces instead of a single piece.

The pet seat apparatus 10 shown in FIGS. 9A-13B can include all the pieces for the "seat in" and "seat out" configurations so that an owner of an ATV can have the option to set up the pet seat apparatus 10 as desirable. Further, the pet seat apparatus 10 can also include pads 52 that fit each separate piece of both configurations, or a single pad that can fit the seat base 20 built from the separate pieces for each configuration. The pet seat apparatus 10 described herein is set up where each pet seat apparatus can be tailer made for every specific brand and model of side-by-side ATV know so that all the space around the pet seat apparatus 10 is minimized to prevent a pet's limb from being trapped between the pet seat apparatus 10 and parts of the side-by-side ATV.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A pet seat apparatus for a side-by-side ATV, the pet seat apparatus comprising:
a seat base for supporting a pet in the ATV, the seat base comprising:
a central piece;
a door side piece that is selectively attachable to a door side of the central piece;
a console side piece that is selectively attachable to a console side of the central piece; and
a rear side piece that is selectively attachable to a rear side of the central piece, the rear side piece configured to match the contour of a back rest of a back seat of the ATV or to match the contour of a back side of a cabin of the ATV; and
a support apparatus for holding the seat base at a desired position in the ATV.

2. The pet seat apparatus 1 wherein the support apparatus includes multiple support posts extending from the pet seat apparatus.

3. The pet seat apparatus of claim 2 wherein the support posts include a shaft extending from top portions thereof to engage openings disposed in the seat base.

4. The pet seat apparatus of claim 1 wherein the door side piece has a side that is configured to match the contour of an inside part of a back door of the ATV such that the space between the door side piece and the inside part of the back door of the ATV is less than about 0.5 inches.

5. The pet seat apparatus of claim 1 wherein the console side piece has a side that is configured to match the contour of a side of a console of the ATV such that the space between the console side piece and the console of the ATV is less than about 0.5 inches.

6. The pet seat apparatus of claim 3 wherein each central piece, the console side piece and the door side piece has at least one opening therein to engage at least one support post.

7. The pet seat apparatus of claim 1 wherein the central piece has grooves disposed in sides thereof to slidably receive tongue portions disposed on sides of the door side piece, the console side piece and the rear side piece.

8. The pet seat apparatus of claim 7 wherein the tongue portions include a neck portion and bulbous portion to prevent the pieces of the seat base from being easily pulled apart.

9. The pet seat apparatus of claim 1 wherein the central piece has tongue portions disposed on sides thereof to slidably engage grooves disposed in sides of the first side piece, the second side piece and the rear side piece.

10. The pet seat apparatus of claim 1 further comprising a front side piece that is selectively attachable to a front side of the central piece.

11. The pet seat apparatus of claim 10 wherein the front side piece includes at least one opening to engage at least one support post.

12. A pet seat apparatus for a side-by-side ATV, the pet seat apparatus comprising:
a seat base for supporting a pet in the ATV, the seat base comprising:
a central piece for use in the seat base for a seat-in configuration for the ATV and a seat-out configuration of the ATV;

a first door side piece that is selectively attachable to a door side of the central piece for the seat-in configuration;

a first console side piece that is selectively attachable to a console side of the central piece for the seat-in configuration;

a first rear side piece that is selectively attachable to a rear side of the central piece for the seat-in configuration, the first rear side piece configured to match the contour of a back rest of a back seat of the ATV;

a second door side piece that is selectively attachable to the door side of the central piece for the seat-out configuration;

a second console side piece that is selectively attachable to the console side of the central piece for the seat-out configuration;

a second rear side piece that is selectively attachable to the rear side of the central piece for the seat-out configuration, the second rear side piece configured to match the contour of a back side of a cabin of the ATV; and a support apparatus for holding the seat base at a desired position in the ATV.

13. The pet seat apparatus 14 wherein the support apparatus includes multiple support posts extending from the pet seat apparatus.

14. The pet seat apparatus of claim 13 wherein the support posts include a shaft extending from top portions thereof to engage openings disposed in the seat base.

15. The pet seat apparatus of claim 12 further comprising a first front side piece that is selectively attachable to a front side of the central piece for the seat-in configuration.

16. The pet seat apparatus of claim 15 further comprising a second front side piece that is selectively attachable to the front side of the central piece for the seat-out configuration.

17. The pet seat apparatus of claim 12 wherein the central piece has grooves disposed in sides thereof to slidably receive tongue portions disposed on sides of the first door side piece, the second door side piece, the first console side piece, the second consoled side piece, the first rear side piece and the second rear side piece.

18. The pet seat apparatus of claim 12 wherein the central piece has tongue portions disposed on sides thereof to slidably engage grooves disposed in sides of the first door side piece, the second door side piece, the first console side piece, the second consoled side piece, the first rear side piece and the second rear side piece.

\* \* \* \* \*